(12) United States Patent
Kale

(10) Patent No.: US 12,501,002 B2
(45) Date of Patent: Dec. 16, 2025

(54) DISTRIBUTED CAMERA SYSTEM

(71) Applicant: Micron Technology, Inc., Boise, ID (US)

(72) Inventor: Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 132 days.

(21) Appl. No.: 17/463,412

(22) Filed: Aug. 31, 2021

(65) Prior Publication Data

US 2023/0069768 A1 Mar. 2, 2023

(51) Int. Cl.
*H04N 7/18* (2006.01)
*G06N 3/045* (2023.01)
*G06N 3/08* (2023.01)

(52) U.S. Cl.
CPC ............. *H04N 7/181* (2013.01); *G06N 3/045* (2023.01); *G06N 3/08* (2013.01)

(58) Field of Classification Search
CPC ........ H04N 7/181; G06N 3/063; G06N 3/045; G06N 3/08; G08B 13/19602
See application file for complete search history.

(56) References Cited

U.S. PATENT DOCUMENTS

| 11,733,274 | B1* | 8/2023 | Zlotnik | G01R 15/08 |
| | | | | 324/76.39 |
| 2017/0085774 | A1 | 3/2017 | Majumdar et al. | |
| 2018/0349709 | A1* | 12/2018 | Shinohara | G06V 20/52 |
| 2019/0289263 | A1* | 9/2019 | Amini | G06V 20/52 |
| 2020/0117982 | A1* | 4/2020 | Chiu | G06N 3/063 |
| 2020/0234411 | A1* | 7/2020 | Xu | H04N 9/646 |
| 2020/0293828 | A1 | 9/2020 | Wang et al. | |
| 2020/0320356 | A1* | 10/2020 | Butt | G06V 10/454 |
| 2020/0356774 | A1* | 11/2020 | Korn | H04N 7/181 |
| 2020/0394902 | A1* | 12/2020 | Elliott | G08B 13/19656 |
| 2021/0048808 | A1 | 2/2021 | Bielby et al. | |
| 2021/0142146 | A1* | 5/2021 | Kale | G06V 10/82 |
| 2022/0076084 | A1* | 3/2022 | Murphy | G06N 20/00 |

(Continued)

OTHER PUBLICATIONS

Wang et al, Compute-Capable Block RAMs for Efficient Deep Learning Acceleration on FPGAs, 2021, IEEE 29th Annual International Symposium on Field-Programmable Custom Computing Machines (FCCM), pp. 88-96. (Year: 2021).*

(Continued)

*Primary Examiner* — Kathleen M Broughton
(74) *Attorney, Agent, or Firm* — Greenberg Traurig

(57) ABSTRACT

A system having a central station and a plurality of cameras installed various locations. To search for and locate an item of interest, the central station generates and sends an item model to the cameras. When stored in a camera, the item model causes a logic circuit of the camera (e.g., a deep learning accelerator) to use image data, received from an image sensor for storing in a memory device of the camera, as an input to an artificial neural network. The logic circuit performs the matrix computation of the artificial neural network to generate a classification of whether the images are relevant to the item of interest characterized by the item model. If so, the camera transmits the relevant images to the central station for further processing to determine a real time location of the item of interest.

20 Claims, 11 Drawing Sheets

(56) References Cited

U.S. PATENT DOCUMENTS

2022/0148398 A1* 5/2022 Kerzner .......... G08B 13/19697

OTHER PUBLICATIONS

Bavandpour et al, aCortex: An Energy-Efficient Multipurpose Mixed-Signal Inference Accelerator, 2020, IEEE J. on Exploratory Solid-State Computational Devices and Circuits, 6(1); 98-106. (Year: 2020).*

Resch et al, Machine Learning Accelerator In-Memory for Energy Harvesting, 2019, arXiv:1908.11373v1, pp. 1-23. (Year: 2019).*

* cited by examiner

DISTRIBUTED CAMERA SYSTEM

TECHNICAL FIELD

At least some embodiments disclosed herein relate to camera systems in general and more particularly, but not limited to techniques to search for and locate an item of interest using a distributed camera system.

BACKGROUND

A surveillance system has a population of security cameras installed at various locations. A security camera can be connected to a memory sub-system to store video images captured by the camera. The stored video images can be reviewed during the investigations of incidents.

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to a camera system to search for and locate an item of interest using the computing power of a distributed camera system. A typical camera in the system is configured with a non-volatile memory to record recent images of surroundings and a deep learning accelerator to process the images according to an item model received from a central station. To search for and locate an item of interest, the central station broadcasts an item model to the cameras in the system. A camera receiving the item model uses its deep learning accelerator to process stored images according to the item model. When a classification of a match is determined from the processing of the item model against the recent images, the camera is configured to report the match and/or the corresponding images to the central station.

Video images from surveillance cameras have a huge amount of data that requires communication bandwidth to transmit and computing power to process. Searching for an item (e.g., a vehicle) to determine its location in a city or region can be a challenge.

At least some aspects of the present disclosure address the above and other deficiencies and/or challenges by distributing the computing tasks to surveillance cameras. To search for the location of an item of interest, such as a vehicle, a central station can generate or compile an artificial neural network model of the item. After the central station sends the model to a network of security cameras, each of the security cameras can process its recorded video images using its Deep Learning Accelerator (DLA). The item model is configured to instruct the DLA of the camera to determine whether the most recent clip has a match to the model of the item. A matching result can be sent back to the central station for further analysis and/or inspection by an authorized person. Thus, the requirement on communication bandwidth for the transmission of data from the security cameras to the central station is reduced; and the computing power requirement on the central station can also be reduced.

For example, an integrated circuit device configured in a camera can perform computations of Artificial Neural Networks (ANNs) with reduced energy consumption and computation time. The integrated circuit device includes a Deep Learning Accelerator (DLA) and a random access memory. The Deep Learning Accelerator has distinct data access patterns of read-only and read-write, with multiple concurrent, large data block transfers. Thus, the integrated circuit device can use a heterogeneous memory system architecture to optimize its memory configuration in supporting the Deep Learning Accelerator for improved performance and energy usage.

Figure 1:
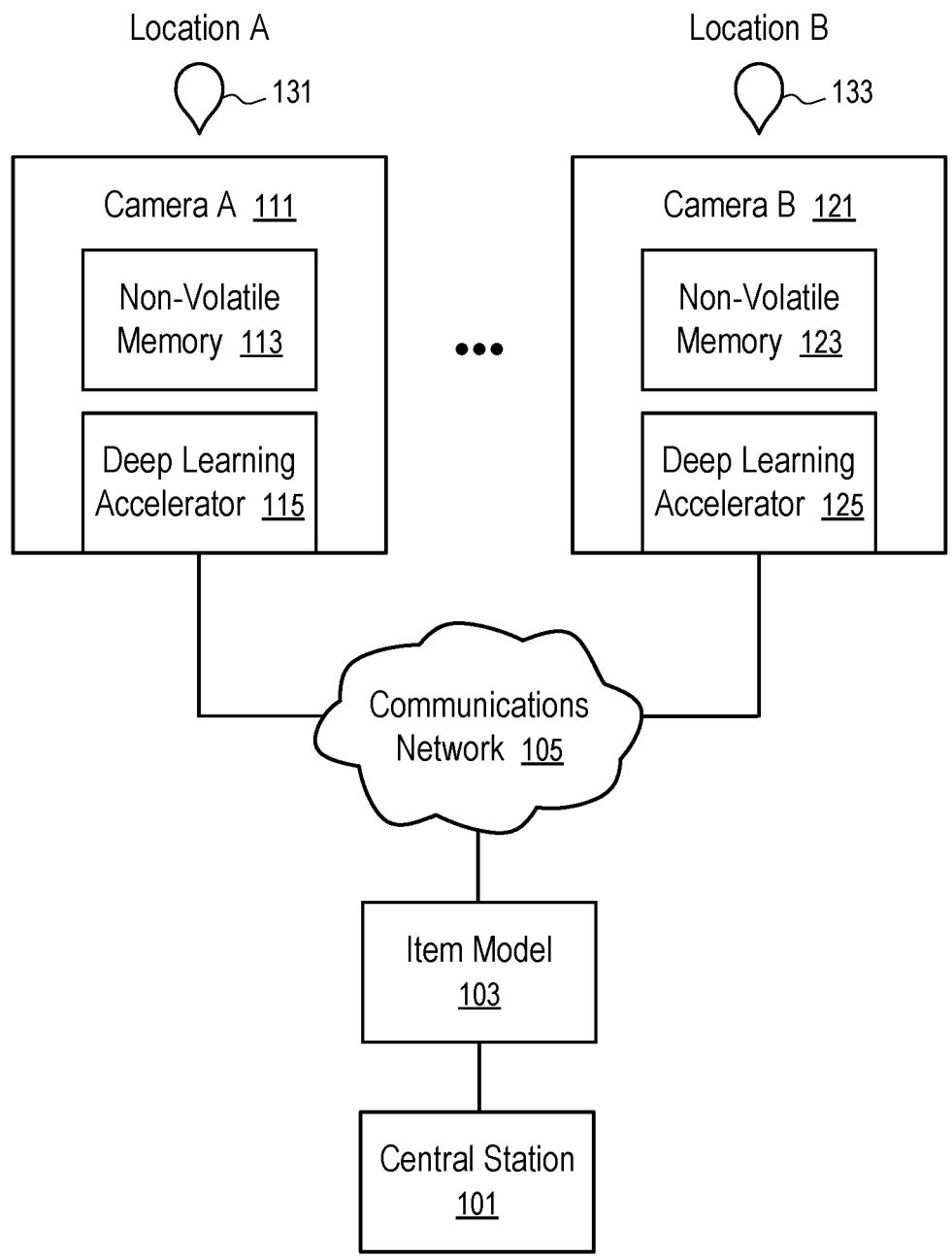
FIG. 1 shows a camera system configured to facilitate the real time search of an item of interest according to one embodiment.

FIG. 1 shows a camera system configured to facilitate the real time search of an item of interest according to one embodiment.

In the system of FIG. 1, a network of intelligent cameras (e.g., 111, . . . , 121) are configured to process video images according to an item model 103 received from a central station 101. The imaging processing performed by the cameras (e.g., 111, . . . , 121) can facilitate the search for the real time, or near real time, location of an item of in interest characterized by the item model 103.

The cameras (e.g., 111, . . . , 121) can be configured for the general surveillance of a geographic area. For example, the infrastructure of a city can have cameras positioned at various locations (e.g., 131, . . . , 133). Each camera (e.g., 111 or 121) can have a non-volatile memory (e.g., 113 or 123) to store the most recently captured video. The most recent video can be recorded cyclically in the non-volatile memory (e.g., 113 or 123) such that the oldest video images are erased to store the newest video images. The camera (e.g., 111, or 121) can have a Deep Learning Accelerator (DLA) (e.g., 115 or 125).

A Deep Learning Accelerator (e.g., 115 or 125) is configured to execute instructions to perform the matrix computation of an artificial neural network (ANN). The processing capability of the Deep Learning Accelerator (e.g., 115 or 125) can be used to process the most recent video stream in the non-volatile memory (e.g., 113 or 123) of the camera (e.g., 111, or 121) to at least determine whether the video images are relevant to an item of interest. Thus, the processing at the camera (e.g., 111 or 121) can reduce the transmission of images that are not relevant to the item of interest over the communications network to the central station 101. The distributed processing at the cameras 111, . . . , 121 also reduces the computing burden at the central station 101 in facilitate real-time or near real-time locating of an item of interest, such as a vehicle, a missing person, an object, etc.

To search for and locate an item of interest, the central station 101 can generate an item model 103 configured to be executed by the Deep Learning Accelerators 115, . . . , 125 of the cameras 111, . . . , 121. The item model 103 is transmitted from the central station 101 through communications network 105 to the digital cameras 111, . . . , 121.

A Deep Learning Accelerator (e.g., 115 or 125) can execute the item model 103 to process a recent video clip stored in the non-volatile memory (e.g., 113 or 123) of the corresponding camera (e.g., 111 or 121). For example, as new video images are being stored into the non-volatile memory 113, the images are used as input to the item model 103 executed by the deep learning accelerator 115 to generate a classification output. For example, the execution of the item model 103 in a deep learning accelerator (e.g., 115) uses an artificial neural network to classify whether input images in the non-volatile memory (e.g., 113) are relevant to the item of interest. Further, if an image is classified as being of interest, the execution of the item model 103 can further extract a portion of the image that is representative of the item of interest.

When the execution of the item model 103 in a camera (e.g., 111) determines that a video clip stored in the non-volatile memory 113 is relevant to the item of interest, the digital camera 111 transmits the video clip to the central station 101 for further processing. The central station 101 processes the video clip for improved confidence level of classifying the video clip as being relevant to the item of interest.

When the central station 101 determines that the video clip captures the item of interest, the location of the item of interest can be estimated based on the location (e.g., 131) of the camera (e.g., 111) submitting the video clip. Further, the central station 101 can analyze the movement of the item captured the video clip and/or other information to improve the estimation of the real time location of the item of interest.

Optionally, when there is a match between a video clip and the item model 103 characterizing the item of interest, the camera (e.g., 111) can select a portion of the video clip that has the best match to reduce the data to be transmitted to the central station 101 for further processing.

When there is no match, the camera (e.g., 111 or 121) does not transmit its most recent video clip to the central station 101.

After the further processing at the central station 101 determines that an image or video initially submitted from a camera (e.g., 111) has capture the item of interest, the central station 101 can optionally request the camera 111 to submit more images or video captured in a time period that contains the initially submitted image or video. The analysis of the further images or videos can improve the confidence level of identifying the item of interest and/or determine the movements of the item for improved estimates of the current locations of the item.

Optionally, the central station 101 can present the video clip or the best matching image in a graphical user interface to an authorized person for identification. In some implementations, the central station 101 includes an artificial neural network, more sophisticated than the item model 103, to further analyze the video or image from the digital camera to eliminate false positives before presenting the result to an authorized person.

The item model 103 configured for the cameras 111, . . . , 121 can be based on an artificial neural network that is reduced to simplify computation for the deep learning accelerators 115, . . . , 125. The simplification can reduce the confidence levels of a classification of whether a video or image is relevant to, or matches with, an item of interest. The central station 101 can have a more accurate model that can positively identify an item from an image with a level of confidence higher than the results generated by the cameras 111, . . . , 121 according to the item model 103. After the positive identification using the more accurate model, the central station 101 can request further video images from the camera (e.g., 111) that initially reports a matching image or video. The further video images can be processed to identify the movements of the item as captured by the camera, and estimate a current location of the item.

In some instances, during the time of the processing, the item of interest may move out of the field of view of one camera (e.g., 111) and move into the field of view of another camera (e.g., 121). The central station 101 can use the pattern of time and location data of the item of interest, as recently captured by the cameras to predict or estimate a current location of the item of interest and to identify the camera or cameras that are best positioned capture a current view the item of interest. Thus, the attention of an authorized person can be directed to the real-time view of the selected cameras. For example, to reduce the processing delay, the real-time images as captured by the selected cameras can be streamed to a monitor of an authorized person for close monitoring and identification.

Figure 2:
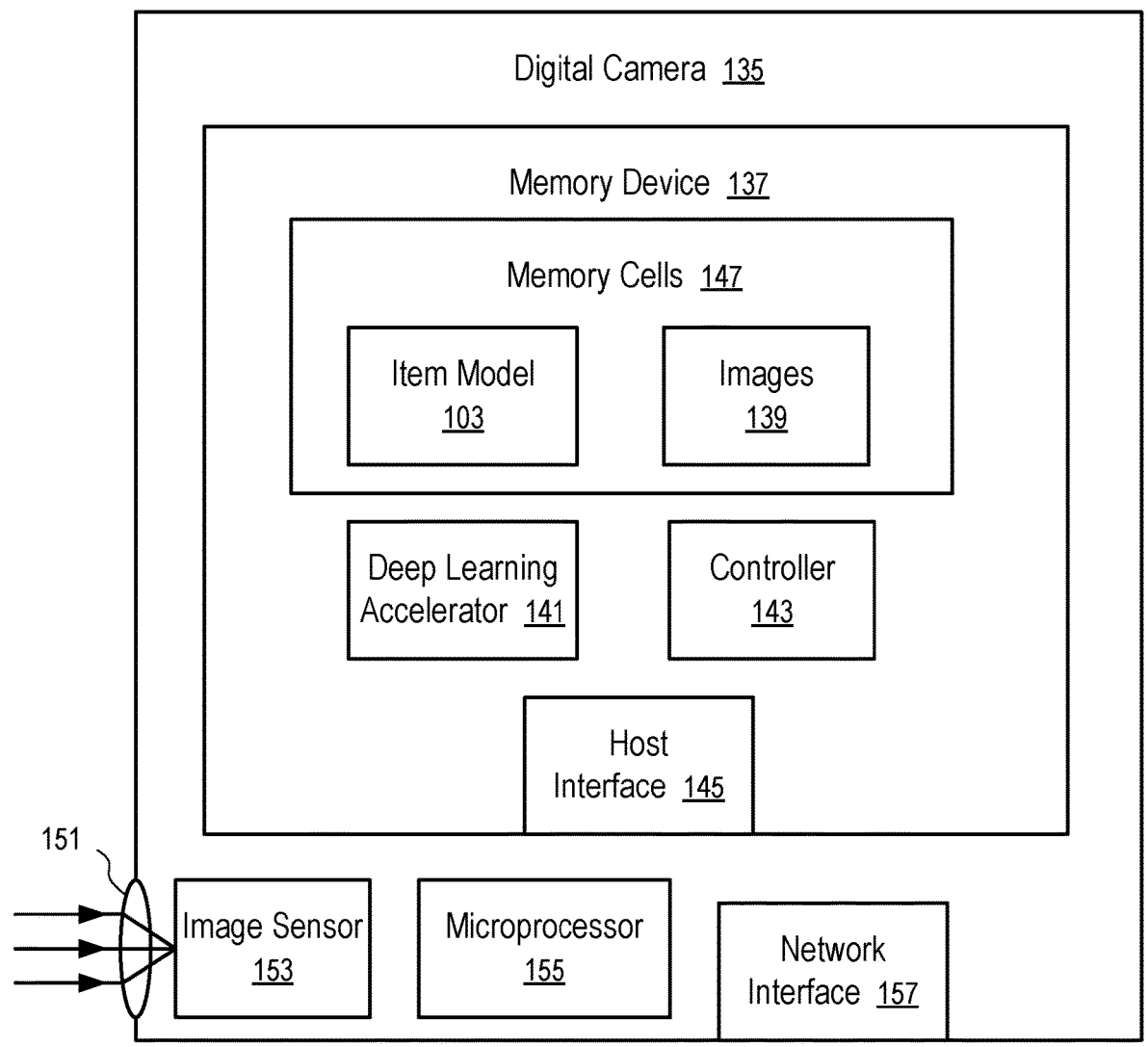
FIG. 2 illustrates a digital camera having a deep learning accelerator according to one embodiment.

FIG. 2 illustrates a digital camera having a deep learning accelerator according to one embodiment.

For example, the cameras 111, . . . , 121 in the system of FIG. 1 can be implemented using the digital camera 135 illustrated in FIG. 2.

In FIG. 2, the camera 135 has a lens 151, an image sensor 153, a microprocessor 155, a network interface 157, and a memory device 137. The image sensor 153 and/or the microprocessor 155 can record images and/or videos into the memory device 137 via a host interface 145.

The memory device 137 has a host interface 145, a controller 143, a deep learning accelerator 141, and memory cells 147 to store an item model 103 and images 139.

The camera 135 can be configured to use the network interface 157 to receive an item model 103 from a central station 101. After the item model 103 is stored in the memory device 137, the deep learning accelerator 141 can process the images 139 received from the image sensor 153 as the images being received via the host interface 145 for storing in the memory cells 147. In some implementations, at least a portion of the memory cells 147 is a non-volatile memory (e.g., 113, or 123). Thus, the images 139 stored in the memory cells 147 can be reviewed for subsequent investigation of an incident near the camera 135. For example, the memory cells 147 can have the storage capacity to record video clips of third minutes, one hour, or longer, such that after an incident is being reported near the camera, the stored images 139 can be retrieved by the central station 101 for preservation and to facilitate the investigation of the incident.

Further, the central station 101 can send an item model 103 to the camera 135 to facilitate the search and locating of an item of interest, as in the system of FIG. 1.

When the item model 103 is stored in the memory cell 147, the memory device 137 automatically uses the images 139 received via the host interface 145 for storing as an input to an artificial neural network in the item model 103. The output of the artificial neural network in the item model 103 contains an indication of whether the input to the artificial neural network is relevant to an item of interest.

In response to a classification that one or more images received as the input to the artificial neural network in the item model 103 is relevant to the item of interest characterized by the item model 103, the controller 143 reports the match to the microprocessor 155, which is configured to transmit, via the network interface 157, the matching images 139 to the central station 101.

The Deep Learning Accelerator (e.g., 141, 115, 125) includes a set of programmable hardware computing logic that is specialized and/or optimized to perform parallel vector and/or matrix calculations, including but not limited to multiplication and accumulation of vectors and/or matrices.

Further, the Deep Learning Accelerator (DLA) can include one or more Arithmetic-Logic Units (ALUs) to perform arithmetic and bitwise operations on integer binary numbers.

The Deep Learning Accelerator (DLA) is programmable via a set of instructions to perform the computations of an Artificial Neural Network (ANN).

For example, each neuron in the ANN receives a set of inputs. Some of the inputs to a neuron can be the outputs of certain neurons in the ANN; and some of the inputs to a neuron can be the inputs provided to the ANN. The input/output relations among the neurons in the ANN represent the neuron connectivity in the ANN.

For example, each neuron can have a bias, an activation function, and a set of synaptic weights for its inputs respectively. The activation function can be in the form of a step function, a linear function, a log-sigmoid function, etc. Different neurons in the ANN can have different activation functions.

For example, each neuron can generate a weighted sum of its inputs and its bias and then produce an output that is the function of the weighted sum, computed using the activation function of the neuron.

The relations between the input(s) and the output(s) of an ANN in general are defined by an ANN model that includes the data representing the connectivity of the neurons in the ANN, as well as the bias, activation function, and synaptic weights of each neuron. Based on a given ANN model, a computing device can be configured to compute the output (s) of the ANN from a given set of inputs to the ANN.

For example, the inputs to the ANN can be generated based on camera inputs; and the outputs from the ANN can be the identification of an item, such as an event or an object.

In general, an ANN can be trained using a supervised method where the parameters in the ANN are adjusted to minimize or reduce the error between known outputs associated with or resulted from respective inputs and computed outputs generated via applying the inputs to the ANN. Examples of supervised learning/training methods include reinforcement learning and learning with error correction.

Alternatively, or in combination, an ANN can be trained using an unsupervised method where the exact outputs resulted from a given set of inputs is not known before the completion of the training. The ANN can be trained to classify an item into a plurality of categories, or data points into clusters.

Multiple training algorithms can be employed for a sophisticated machine learning/training paradigm.

Deep learning uses multiple layers of machine learning to progressively extract features from input data. For example, lower layers can be configured to identify edges in an image; and higher layers can be configured to identify, based on the edges detected using the lower layers, items captured in the image, such as faces, objects, events, etc. Deep learning can be implemented via Artificial Neural Networks (ANNs), such as deep neural networks, deep belief networks, recurrent neural networks, and/or convolutional neural networks.

The granularity of the Deep Learning Accelerator (DLA) operating on vectors and matrices corresponds to the largest unit of vectors/matrices that can be operated upon during the execution of one instruction by the Deep Learning Accelerator (DLA). During the execution of the instruction for a predefined operation on vector/matrix operands, elements of vector/matrix operands can be operated upon by the Deep Learning Accelerator (DLA) in parallel to reduce execution time and/or energy consumption associated with memory/data access. The operations on vector/matrix operands of the granularity of the Deep Learning Accelerator (DLA) can be used as building blocks to implement computations on vectors/matrices of larger sizes.

The implementation of a typical/practical Artificial Neural Network (ANN) involves vector/matrix operands having sizes that are larger than the operation granularity of the Deep Learning Accelerator (DLA). To implement such an Artificial Neural Network (ANN) using the Deep Learning Accelerator (DLA), computations involving the vector/matrix operands of large sizes can be broken down to the computations of vector/matrix operands of the granularity of the Deep Learning Accelerator (DLA). The Deep Learning Accelerator (DLA) can be programmed via instructions to carry out the computations involving large vector/matrix operands. For example, atomic computation capabilities of the Deep Learning Accelerator (DLA) in manipulating vectors and matrices of the granularity of the Deep Learning Accelerator (DLA) in response to instructions can be programmed to implement computations in an Artificial Neural Network (ANN).

In some implementations, the Deep Learning Accelerator (DLA) lacks some of the logic operation capabilities of a typical Central Processing Unit (CPU). However, the Deep Learning Accelerator (DLA) can be configured with sufficient logic units to process the input data provided to an Artificial Neural Network (ANN) and generate the output of the Artificial Neural Network (ANN) according to a set of instructions generated for the Deep Learning Accelerator (DLA). Thus, the Deep Learning Accelerator (DLA) can perform the computation of an Artificial Neural Network (ANN) with little or no help from a Central Processing Unit (CPU) or another processor. Optionally, a conventional general purpose processor can also be configured as part of the Deep Learning Accelerator (DLA) to perform operations that cannot be implemented efficiently using the vector/matrix processing units of the Deep Learning Accelerator (DLA), and/or that cannot be performed by the vector/matrix processing units of the Deep Learning Accelerator (DLA).

A typical Artificial Neural Network (ANN) can be described/specified in a standard format (e.g., Open Neural Network Exchange (ONNX)). A compiler can be used to convert the description of the Artificial Neural Network (ANN) into a set of instructions for the Deep Learning Accelerator (DLA) to perform calculations of the Artificial Neural Network (ANN). The compiler can optimize the set of instructions to improve the performance of the Deep Learning Accelerator (DLA) in implementing the Artificial Neural Network (ANN).

The Deep Learning Accelerator (DLA) can have local memory, such as registers, buffers and/or caches, configured to store vector/matrix operands and the results of vector/matrix operations. Intermediate results in the registers can be pipelined/shifted in the Deep Learning Accelerator (DLA) as operands for subsequent vector/matrix operations to reduce time and energy consumption in accessing memory/data and thus speed up typical patterns of vector/matrix operations in implementing a typical Artificial Neural Network (ANN). The capacity of registers, buffers and/or caches in the Deep Learning Accelerator (DLA) is typically insufficient to hold the entire data set for implementing the computation of a typical Artificial Neural Network (ANN). Thus, a random access memory coupled to the Deep Learning Accelerator (DLA) is configured to provide an improved data storage capability for implementing a typical Artificial Neural Network (ANN). For example, the Deep Learning Accelerator (DLA) loads data and instructions from the random access memory and stores results back into the random access memory.

The communication bandwidth between the Deep Learning Accelerator (DLA) and the random access memory is configured to optimize or maximize the utilization of the computation power of the Deep Learning Accelerator (DLA). For example, high communication bandwidth can be provided between the Deep Learning Accelerator (DLA) and the random access memory such that vector/matrix operands can be loaded from the random access memory into the Deep Learning Accelerator (DLA) and results stored back into the random access memory in a time period that is approximately equal to the time for the Deep Learning Accelerator (DLA) to perform the computations on the vector/matrix operands. The granularity of the Deep Learning Accelerator (DLA) can be configured to increase the ratio between the amount of computations performed by the Deep Learning Accelerator (DLA) and the size of the vector/matrix operands such that the data access traffic between the Deep Learning Accelerator (DLA) and the random access memory can be reduced, which can reduce the requirement on the communication bandwidth between the Deep Learning Accelerator (DLA) and the random access memory. Thus, the bottleneck in data/memory access can be reduced or eliminated.

Figure 3:
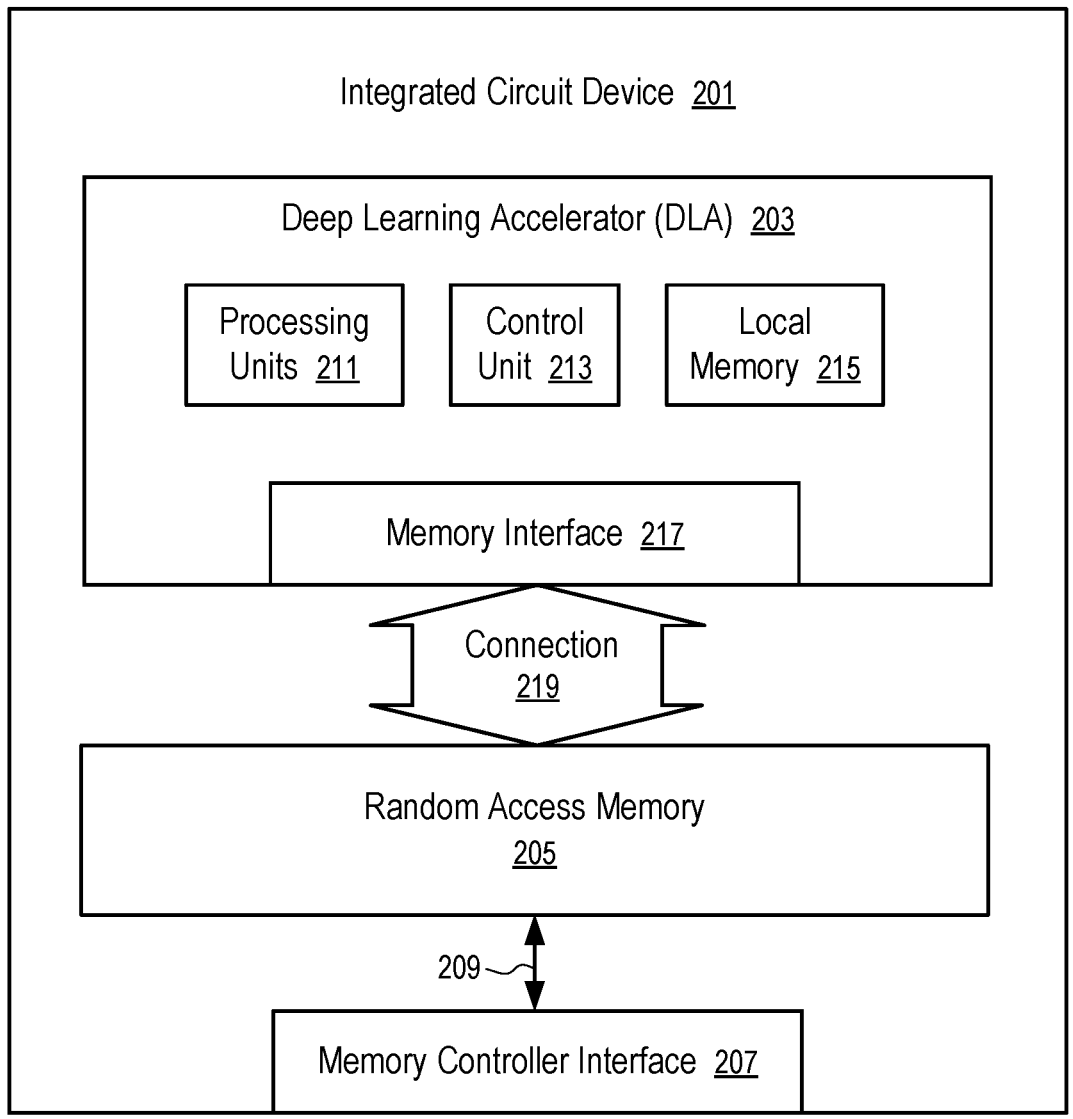
FIG. 3 shows an integrated circuit device having a Deep Learning Accelerator and a random access memory configured according to one embodiment.

FIG. 3 shows an integrated circuit device 201 having a Deep Learning Accelerator 203 and a random access memory 205 configured according to one embodiment.

For example, the integrated circuit device 201 of FIG. 3 can be used to implement the memory device 137 of the camera 135 illustrated in FIG. 2, and/or the cameras 111, . . . , 121 in the system of FIG. 1.

The Deep Learning Accelerator 203 in FIG. 3 includes processing units 211, a control unit 213, and local memory 215. When vector and matrix operands are in the local memory 215, the control unit 213 can use the processing units 211 to perform vector and matrix operations in accordance with instructions. Further, the control unit 213 can load instructions and operands from the random access memory 205 through a memory interface 217 and a high speed/bandwidth connection 219.

The integrated circuit device 201 is configured to be enclosed within an integrated circuit package with pins or contacts for a memory controller interface 207.

The memory controller interface 207 is configured to support a standard memory access protocol such that the integrated circuit device 201 appears to a typical memory controller in a way same as a conventional random access memory device having no Deep Learning Accelerator 203. For example, a memory controller external to the integrated circuit device 201 can access, using a standard memory access protocol through the memory controller interface 207, the random access memory 205 in the integrated circuit device 201.

The integrated circuit device 201 is configured with a high bandwidth connection 219 between the random access memory 205 and the Deep Learning Accelerator 203 that are enclosed within the integrated circuit device 201. The bandwidth of the connection 219 is higher than the bandwidth of the connection 209 between the random access memory 205 and the memory controller interface 207.

In one embodiment, both the memory controller interface 207 and the memory interface 217 are configured to access the random access memory 205 via a same set of buses or wires. Thus, the bandwidth to access the random access memory 205 is shared between the memory interface 217 and the memory controller interface 207. Alternatively, the memory controller interface 207 and the memory interface 217 are configured to access the random access memory 205 via separate sets of buses or wires. Optionally, the random access memory 205 can include multiple sections that can be accessed concurrently via the connection 219. For example, when the memory interface 217 is accessing a section of the random access memory 205, the memory controller interface 207 can concurrently access another section of the random access memory 205. For example, the different sections can be configured on different integrated circuit dies and/or different planes/banks of memory cells; and the different sections can be accessed in parallel to increase throughput in accessing the random access memory 205. For example, the memory controller interface 207 is configured to access one data unit of a predetermined size at a time; and the memory interface 217 is configured to access multiple data units, each of the same predetermined size, at a time.

In one embodiment, the random access memory 205 and the integrated circuit device 201 are configured on different integrated circuit dies configured within a same integrated circuit package. Further, the random access memory 205 can be configured on one or more integrated circuit dies that allows parallel access of multiple data elements concurrently.

In some implementations, the number of data elements of a vector or matrix that can be accessed in parallel over the connection 219 corresponds to the granularity of the Deep Learning Accelerator (DLA) operating on vectors or matrices. For example, when the processing units 211 can be operated on a number of vector/matrix elements in parallel, the connection 219 is configured to load or store the same number, or multiples of the number, of elements via the connection 219 in parallel.

Optionally, the data access speed of the connection 219 can be configured based on the processing speed of the Deep Learning Accelerator 203. For example, after an amount of data and instructions have been loaded into the local memory 215, the control unit 213 can execute an instruction to operate on the data using the processing units 211 to generate output. Within the time period of processing to generate the output, the access bandwidth of the connection 219 allows the same amount of data and instructions to be loaded into the local memory 215 for the next operation and the same amount of output to be stored back to the random access memory 205. For example, while the control unit 213 is using a portion of the local memory 215 to process data and generate output, the memory interface 217 can offload the output of a prior operation into the random access memory 205 from, and load operand data and instructions into, another portion of the local memory 215. Thus, the utilization and performance of the Deep Learning Accelerator (DLA) are not restricted or reduced by the bandwidth of the connection 219.

The random access memory 205 can be used to store the model data of an Artificial Neural Network (ANN) and to buffer input data for the Artificial Neural Network (ANN). The model data does not change frequently. The model data can include the output generated by a compiler for the Deep Learning Accelerator (DLA) to implement the Artificial Neural Network (ANN). The model data typically includes matrices used in the description of the Artificial Neural Network (ANN) and instructions generated for the Deep Learning Accelerator 203 to perform vector/matrix operations of the Artificial Neural Network (ANN) based on vector/matrix operations of the granularity of the Deep Learning Accelerator 203. The instructions operate not only on the vector/matrix operations of the Artificial Neural Network (ANN), but also on the input data for the Artificial Neural Network (ANN).

In one embodiment, when the input data is loaded or updated in the random access memory 205, the control unit 213 of the Deep Learning Accelerator 203 can automatically execute the instructions for the Artificial Neural Network (ANN) to generate an output of the Artificial Neural Network (ANN). The output is stored into a predefined region in the random access memory 205. The Deep Learning Accelerator 203 can execute the instructions without help from a Central Processing Unit (CPU). Thus, communications for the coordination between the Deep Learning Accelerator 203 and a processor outside of the integrated circuit device 201 (e.g., a Central Processing Unit (CPU)) can be reduced or eliminated.

Optionally, the logic circuit of the Deep Learning Accelerator 203 can be implemented via Complementary Metal Oxide Semiconductor (CMOS). For example, the technique of CMOS Under the Array (CUA) of memory cells of the random access memory 205 can be used to implement the logic circuit of the Deep Learning Accelerator 203, including the processing units 211 and the control unit 213. Alternatively, the technique of CMOS in the Array of memory cells of the random access memory 205 can be used to implement the logic circuit of the Deep Learning Accelerator 203.

In some implementations, the Deep Learning Accelerator 203 and the random access memory 205 can be implemented on separate integrated circuit dies and connected using Through-Silicon Vias (TSV) for increased data bandwidth between the Deep Learning Accelerator 203 and the random access memory 205. For example, the Deep Learning Accelerator 203 can be formed on an integrated circuit die of a Field-Programmable Gate Array (FPGA) or Application Specific Integrated circuit (ASIC).

Alternatively, the Deep Learning Accelerator 203 and the random access memory 205 can be configured in separate integrated circuit packages and connected via multiple point-to-point connections on a printed circuit board (PCB) for parallel communications and thus increased data transfer bandwidth.

The random access memory 205 can be volatile memory or non-volatile memory, or a combination of volatile memory and non-volatile memory. Examples of non-volatile memory include flash memory, memory cells formed based on negative-and (NAND) logic gates, negative-or (NOR) logic gates, Phase-Change Memory (PCM), magnetic memory (MRAM), resistive random-access memory, cross point storage and memory devices. A cross point memory device can use transistor-less memory elements, each of which has a memory cell and a selector that are stacked together as a column. Memory element columns are connected via two layers of wires running in perpendicular directions, where wires of one layer run in one direction in the layer that is located above the memory element columns, and wires of the other layer run in another direction and are located below the memory element columns. Each memory element can be individually selected at a cross point of one wire on each of the two layers. Cross point memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

For example, non-volatile memory can be configured to implement at least a portion of the random access memory 205. The non-volatile memory in the random access memory 205 can be used to store the model data of an Artificial Neural Network (ANN). Thus, after the integrated circuit device 201 is powered off and restarts, it is not necessary to reload the model data of the Artificial Neural Network (ANN) into the integrated circuit device 201. Further, the non-volatile memory can be programmable/rewritable. Thus, the model data of the Artificial Neural Network (ANN) in the integrated circuit device 201 can be updated or replaced to implement an update Artificial Neural Network (ANN), or another Artificial Neural Network (ANN).

The processing units 211 of the Deep Learning Accelerator 203 can include vector-vector units, matrix-vector units, and/or matrix-matrix units. Examples of units configured to perform for vector-vector operations, matrix-vector operations, and matrix-matrix operations are discussed below in connection with FIGS. 4-6.

Figure 4:
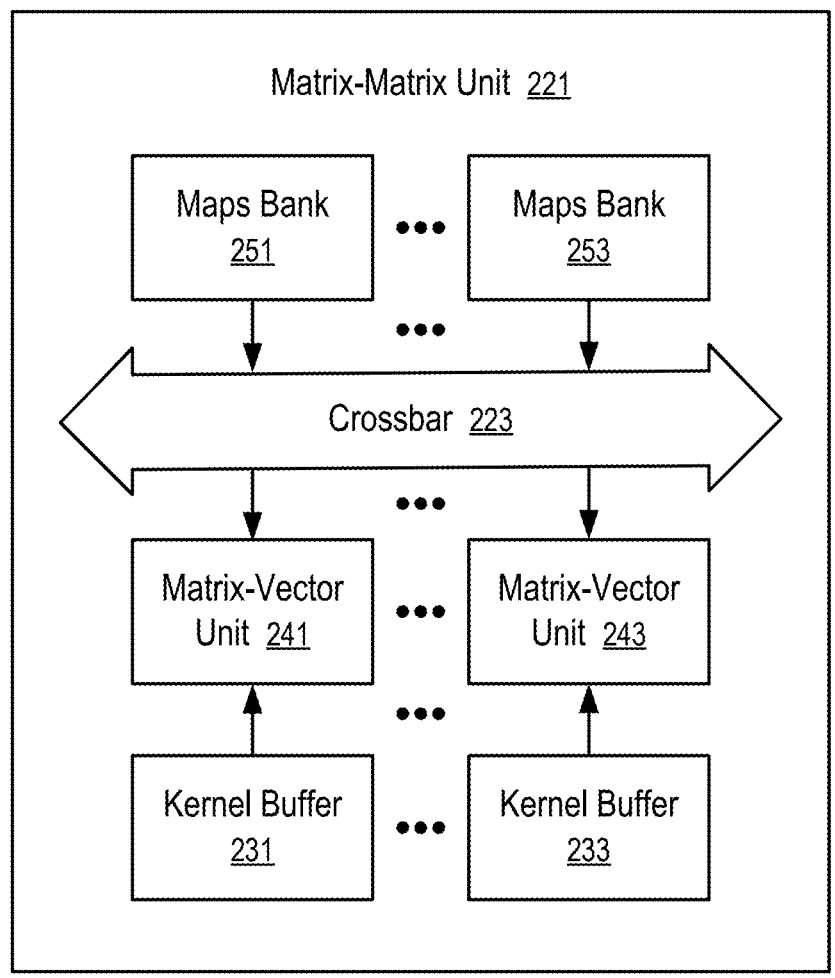
FIG. 4 shows a processing unit configured to perform matrix-matrix operations according to one embodiment.

FIG. 4 shows a processing unit configured to perform matrix-matrix operations according to one embodiment. For example, the matrix-matrix unit 221 of FIG. 4 can be used as one of the processing units 211 of the Deep Learning Accelerator 203 of FIG. 3.

In FIG. 4, the matrix-matrix unit 221 includes multiple kernel buffers 231 to 233 and multiple the maps banks 251 to 253. Each of the maps banks 251 to 253 stores one vector of a matrix operand that has multiple vectors stored in the maps banks 251 to 253 respectively; and each of the kernel buffers 231 to 233 stores one vector of another matrix operand that has multiple vectors stored in the kernel buffers 231 to 233 respectively. The matrix-matrix unit 221 is configured to perform multiplication and accumulation operations on the elements of the two matrix operands, using multiple matrix-vector units 241 to 243 that operate in parallel.

A crossbar 223 connects the maps banks 251 to 253 to the matrix-vector units 241 to 243. The same matrix operand stored in the maps bank 251 to 253 is provided via the crossbar 223 to each of the matrix-vector units 241 to 243; and the matrix-vector units 241 to 243 receives data elements from the maps banks 251 to 253 in parallel. Each of the kernel buffers 231 to 233 is connected to a respective one in the matrix-vector units 241 to 243 and provides a vector operand to the respective matrix-vector unit. The matrix-vector units 241 to 243 operate concurrently to compute the operation of the same matrix operand, stored in the maps banks 251 to 253 multiplied by the corresponding vectors stored in the kernel buffers 231 to 233. For example, the matrix-vector unit 241 performs the multiplication operation on the matrix operand stored in the maps banks 251 to 253 and the vector operand stored in the kernel buffer 231, while the matrix-vector unit 243 is concurrently performing the multiplication operation on the matrix operand stored in the maps banks 251 to 253 and the vector operand stored in the kernel buffer 233.

Figure 5:
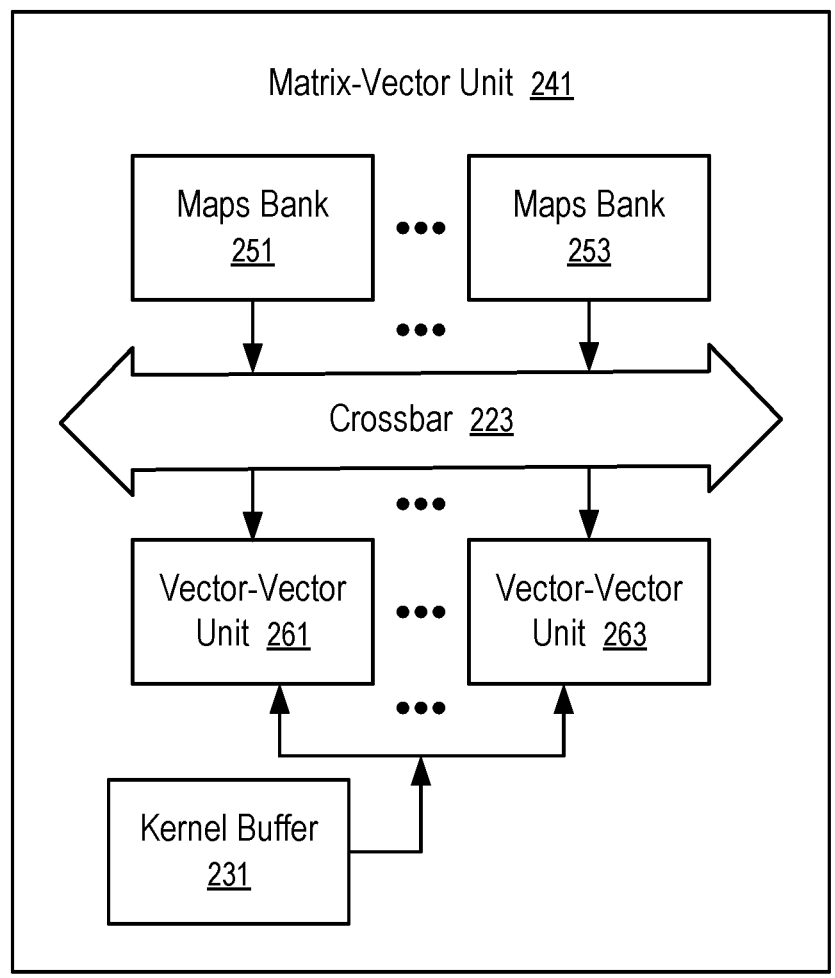
FIG. 5 shows a processing unit configured to perform matrix-vector operations according to one embodiment.

Each of the matrix-vector units 241 to 243 in FIG. 4 can be implemented in a way as illustrated in FIG. 5.

FIG. 5 shows a processing unit configured to perform matrix-vector operations according to one embodiment. For example, the matrix-vector unit 241 of FIG. 5 can be used as any of the matrix-vector units in the matrix-matrix unit 221 of FIG. 4.

In FIG. 5, each of the maps banks 251 to 253 stores one vector of a matrix operand that has multiple vectors stored in the maps banks 251 to 253 respectively, in a way similar to the maps banks 251 to 253 of FIG. 4. The crossbar 223 in FIG. 5 provides the vectors from the maps banks 251 to the vector-vector units 261 to 263 respectively. A same vector stored in the kernel buffer 231 is provided to the vector-vector units 261 to 263.

The vector-vector units 261 to 263 operate concurrently to compute the operation of the corresponding vector operands, stored in the maps banks 251 to 253 respectively, multiplied by the same vector operand that is stored in the kernel buffer 231. For example, the vector-vector unit 261 performs the multiplication operation on the vector operand stored in the maps bank 251 and the vector operand stored in the kernel buffer 231, while the vector-vector unit 263 is concurrently performing the multiplication operation on the vector operand stored in the maps bank 253 and the vector operand stored in the kernel buffer 231.

When the matrix-vector unit 241 of FIG. 5 is implemented in a matrix-matrix unit 221 of FIG. 4, the matrix-vector unit 241 can use the maps banks 251 to 253, the crossbar 223 and the kernel buffer 231 of the matrix-matrix unit 221.

Figure 6:
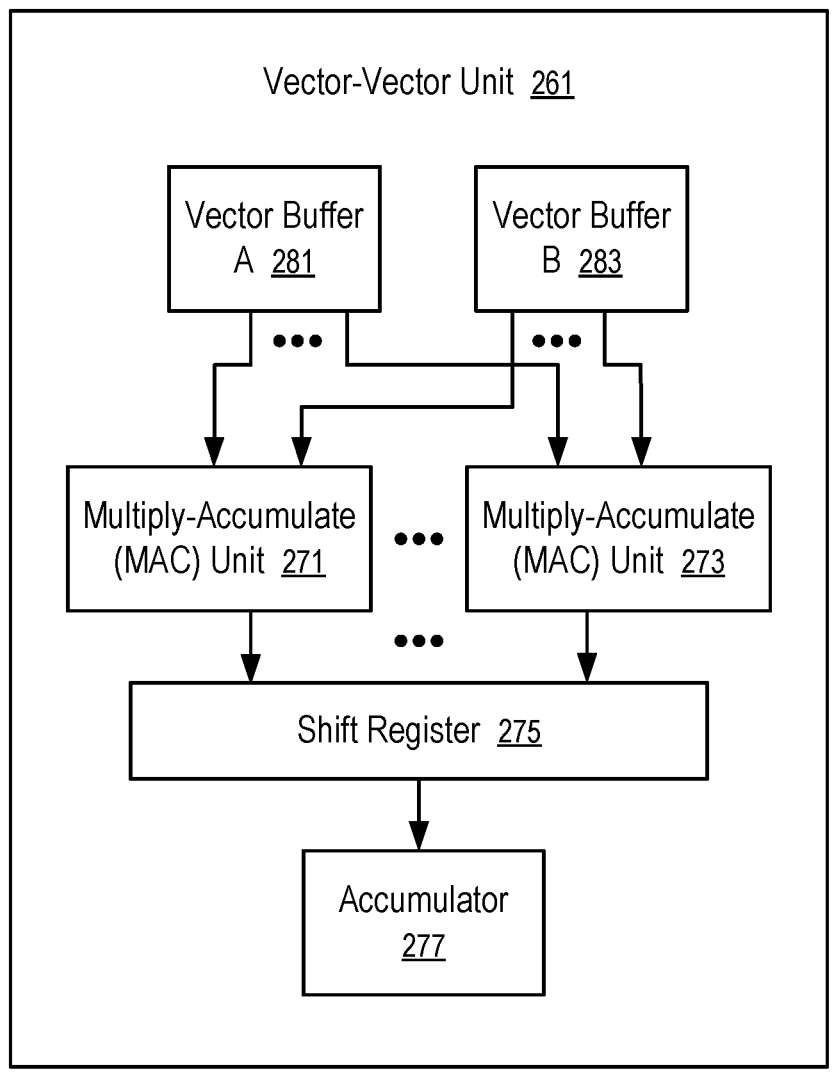
FIG. 6 shows a processing unit configured to perform vector-vector operations according to one embodiment.

Each of the vector-vector units 261 to 263 in FIG. 5 can be implemented in a way as illustrated in FIG. 6.

FIG. 6 shows a processing unit configured to perform vector-vector operations according to one embodiment. For example, the vector-vector unit 261 of FIG. 6 can be used as any of the vector-vector units in the matrix-vector unit 241 of FIG. 5.

In FIG. 6, the vector-vector unit 261 has multiple multiply-accumulate units 271 to 273. Each of the multiply-accumulate units 271 to 273 can receive two numbers as operands, perform multiplication of the two numbers, and add the result of the multiplication to a sum maintained in the multiply-accumulate (MAC) unit.

Each of the vector buffers 281 and 283 stores a list of numbers. A pair of numbers, each from one of the vector buffers 281 and 283, can be provided to each of the multiply-accumulate units 271 to 273 as input. The multiply-accumulate units 271 to 273 can receive multiple pairs of numbers from the vector buffers 281 and 283 in parallel and perform the multiply-accumulate (MAC) operations in parallel. The outputs from the multiply-accumulate units 271 to 273 are stored into the shift register 275; and an accumulator 277 computes the sum of the results in the shift register 275.

When the vector-vector unit 261 of FIG. 6 is implemented in a matrix-vector unit 241 of FIG. 5, the vector-vector unit 261 can use a maps bank (e.g., 251 or 253) as one vector buffer 281, and the kernel buffer 231 of the matrix-vector unit 241 as another vector buffer 283.

The vector buffers 281 and 283 can have a same length to store the same number/count of data elements. The length can be equal to, or the multiple of, the count of multiply-accumulate units 271 to 273 in the vector-vector unit 261. When the length of the vector buffers 281 and 283 is the multiple of the count of multiply-accumulate units 271 to 273, a number of pairs of inputs, equal to the count of the multiply-accumulate units 271 to 273, can be provided from the vector buffers 281 and 283 as inputs to the multiply-accumulate units 271 to 273 in each iteration; and the vector buffers 281 and 283 feed their elements into the multiply-accumulate units 271 to 273 through multiple iterations.

In one embodiment, the communication bandwidth of the connection 219 between the Deep Learning Accelerator 203 and the random access memory 205 is sufficient for the matrix-matrix unit 221 to use portions of the random access memory 205 as the maps banks 251 to 253 and the kernel buffers 231 to 233.

In another embodiment, the maps banks 251 to 253 and the kernel buffers 231 to 233 are implemented in a portion of the local memory 215 of the Deep Learning Accelerator 203. The communication bandwidth of the connection 219 between the Deep Learning Accelerator 203 and the random access memory 205 is sufficient to load, into another portion of the local memory 215, matrix operands of the next operation cycle of the matrix-matrix unit 221, while the matrix-matrix unit 221 is performing the computation in the current operation cycle using the maps banks 251 to 253 and the kernel buffers 231 to 233 implemented in a different portion of the local memory 215 of the Deep Learning Accelerator 203.

Figure 7:
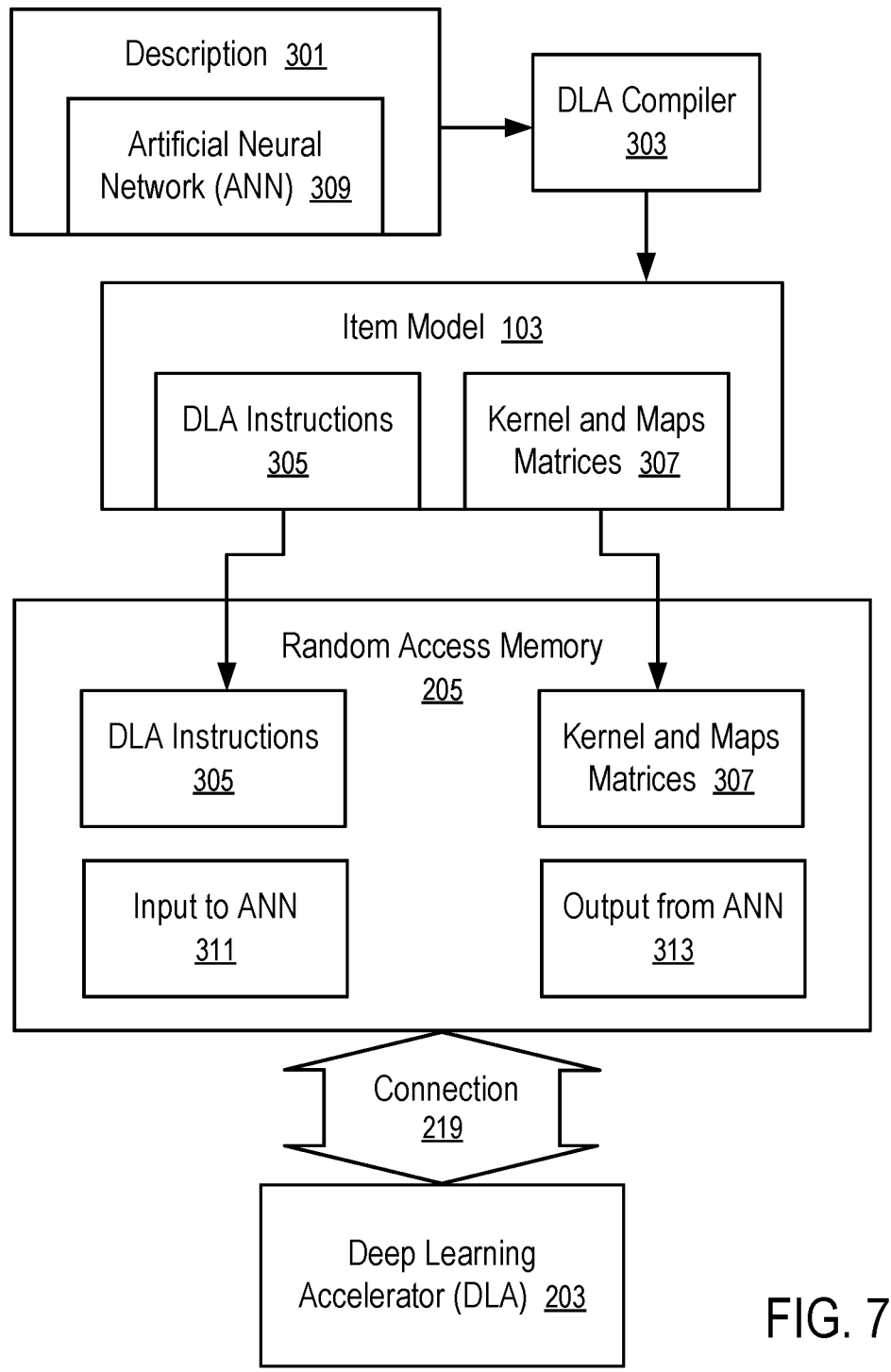
FIG. 7 shows a technique to use an item model to control image processing in a camera according to one embodiment.

FIG. 7 shows a technique to use an item model to control image processing in a camera according to one embodiment.

For example, the technique of FIG. 7 can be implemented in the system of FIG. 1 for the search and locating of an item of interest.

In FIG. 7, a description 301 of an artificial neural network 309 is provided as an input to a compiler 303 for a deep learning accelerator 203, such as the deep learning accelerators 141, 115, and/or 125 in the cameras in FIGS. 1 and 2.

The artificial neural network 309 is configured to classify whether an image (e.g., 139) received as an input to the artificial neural network 309 is relevant to an item of interest. Thus, the artificial neural network 309 includes a characterization of the item of interest.

The compiler 303 generates an item model 103 that includes instructions 305 for the deep learning accelerator 203 to perform matrix computations, and matrices 307 representative of kernels and maps of the artificial neural network 309.

When the instructions 305 and the matrices 307 are stored in a random access memory 205 coupled to the deep learning accelerator 203 via a connection 219 (e.g., a high bandwidth connection 219 in FIG. 3), the deep learning accelerator 203 can automatically execute the instructions 305 to process inputs 311 to the artificial neural network 309 and generate outputs 313 from the artificial neural network 309.

When configured in a camera (e.g., 135, 111, or 121), the images 139 or videos received from an image sensor 153 for recording are automatically recognized as the input 311 to generate the output 313. The output 313 includes an indication of whether the images 139 is relevant to an item of interest, a confidence level of the images 139 being relevant to the item, and/or whether the confidence level is above a threshold identified in the item model 103.

Optionally, the output 313 can include a segment of an image 139, where the segment is selected as representative of the item of interest.

Figure 8:
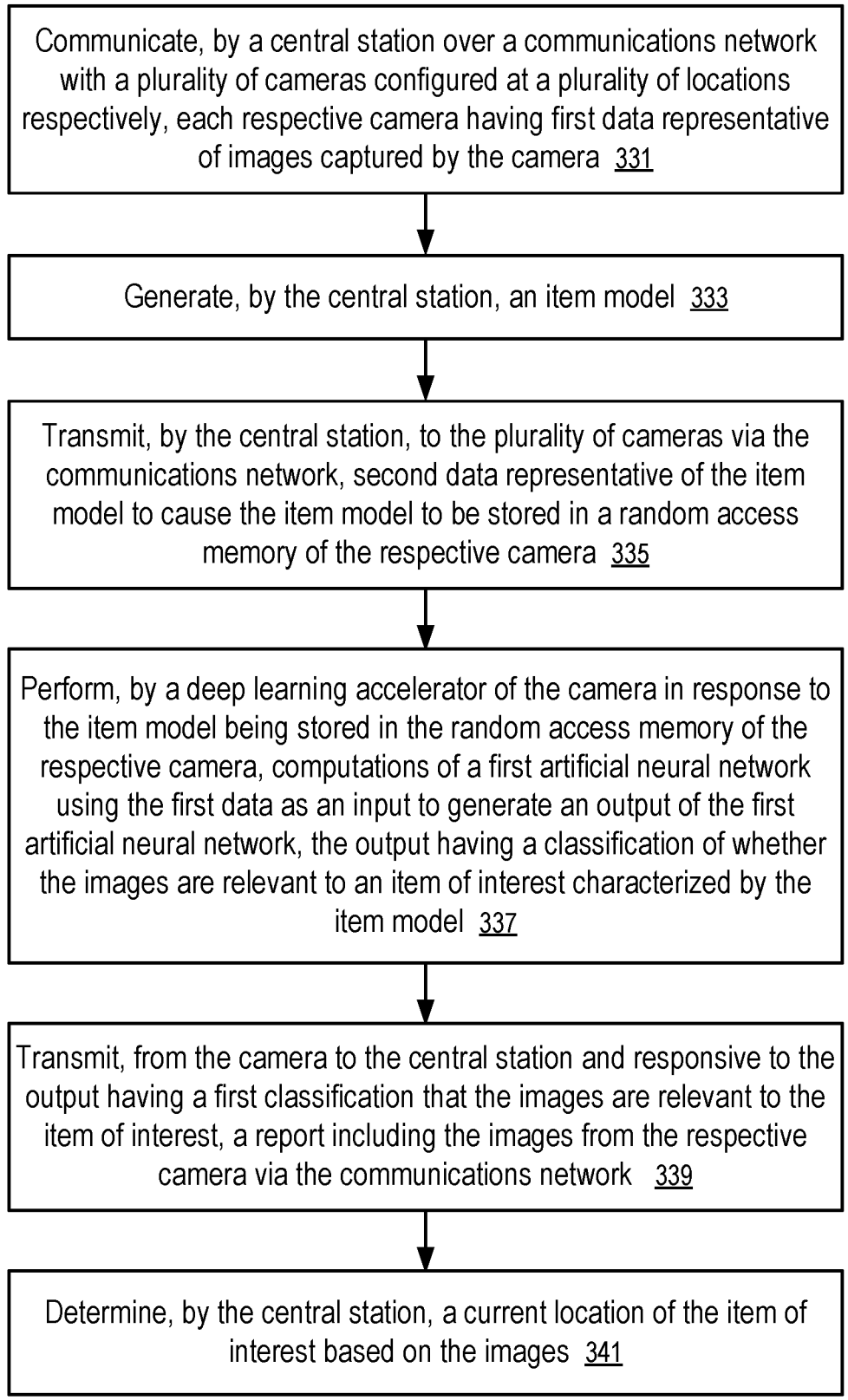
FIG. 8 shows a method to search for and locate an item of interest according to one embodiment.

FIG. 8 shows a method to search for and locate an item of interest according to one embodiment. The methods can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. In some embodiments, the method is performed at least in part by a central station 101, the controller 143, the microprocessor 155, and/or the deep learning accelerator 203 (e.g., 141, 115, or 125), the controller 409 of FIG. 9, processing logic in the memory device 419 of FIG. 10, and/or the processing device 403 of the host system 401 of FIG. 9. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 331, a central station 101 communicates, over a communications network 105 with a plurality of cameras 111, . . . , 121 configured at a plurality of locations 131, . . . , 133 respectively. Each respective camera (e.g., 135) has first data representative of images 139 captured by the camera 135.

For example, a camera 111 has a non-volatile memory 113 having a storage capacity for recording videos of a predetermined length (e.g., 30 minutes, one hour, or more). When with the time length of the video recording after an incident, the central station 101 can request the camera 111 to upload its stored video to the central station for achieve and for review.

At block 333, to search for and locate an item of interest, the central station 101 generates an item model 103.

For example, the item model 103 can include a first artificial neural network 309 configured to classify an image regarding to its relevancy to the item of interest.

For example, the central station 101 has a second artificial neural network to recognize the item of interest from an image. The second artificial neural network can be scaled down to generate the first artificial neural network 309 for the deep learning accelerator 141 to determine the confidence level of an image capturing the item of interest. If the confidence level is above a threshold, the image can be considered to be relevant to the item of interest. The second artificial neural network is more accurate in classifying the image than the first artificial neural network 309 in positively identifying or recognizing the item of interest; however, the first artificial neural network 309 is sufficient to reject images that are no relevant to the item of interest and thus reduce the communications to the central station 101 and the computing burden on the central station 101.

For example, the central station 101 can use a compiler 303 to convert a description 301 of the first artificial neural network 309 into an item model 103 that has instructions 305 for a deep learning accelerator 203 in a camera, and kernel and maps matrices 307 of the first artificial neural network 309.

At block 335, the central station 101 transmits to the plurality of cameras 111, . . . , 121, via the communications network 105, second data representative of the item model 103 to cause the item model 103 to be stored in a random access memory 205 of the respective camera (e.g., 135, 111, or 121).

For example, the item model 103 can include fourth data representative of instructions 305 executable by the logic circuit of the deep learning accelerator 203, and fifth data representative of matrices 307 of the first artificial neural network 309.

At block 337, a deep learning accelerator 203 (e.g., 141, 115, or 125) of the camera (e.g., 135, 111, or 121) performs, in response to the item model 103 being stored in the random access memory 205 of the respective camera (e.g., 135, 111, or 121), computations of the first artificial neural network 309. The computations are performed using the first data as an input 311 to generate an output 313 of the first artificial neural network 309. The output 313 has a classification of whether the images 139 are relevant to the item of interest characterized by the item model 103.

For example, the instructions 305 of the item model 103 stored in the memory cells 147 of the memory device 137 of the camera 135 are configured to be executed automatically by the logic circuit of the deep learning accelerator 141 and/or the controller 143, in response to the host interface 145 receiving the first data representative of the images 139; and the first data is automatically used as the input 311 to the first artificial neural network to generate its output 313.

At block 339, responsive to the output 313 having a first classification that the images 139 are relevant to the item of interest, third data of a report is transmitted from the camera (e.g., 135, 111, or 121) to the central station 101. The report includes the images 139 transmitted from the respective camera (e.g., 135, 111, or 121) via the communications network 105 to the central station.

For example, if the output 313 having a second classification that the images 139 are relevant to the item of interest, the camera (e.g., 135, 111, or 121) can skip transmitting the images 139 to the central station 101.

Optionally, when the output 313 has the first classification, the output 313 further includes a segment identified by the artificial neural network for extraction from an image among the images 139. Instead of transmitting the images 139 in the report to the central station 101, the image segment extracted from the images 139 can be provided in the report to the central station 101. The images 139 can be submitted subsequently when requested by the central station 101.

At block 341, the central station 101 determines a current location of the item of interest based on the images 139.

For example, the central station 101 can separately generate a classification of whether the received images 135 are relevant to the item of interest using its second artificial neural network that is more accurate than the first artificial neural network 309.

For example, the images can be presented on a display device of the central station 101 to an authorized person in response to the second artificial neural network identifying the images as being relevant to the item of interest.

For example, the central station 101 can request the reporting camera (e.g., 135, 111, or 121) to transmit further images that are adjacent, in timing of capture, to the initial images provided in the report to the central station 101; and the central station 101 can analyze the received images to determine the movement of the item of interest as seen by the reporting camera (e.g., 135, 111, or 121).

For example, the central station 101 can analyze or detect a pattern of movement, time, and location of the item of interest as captured or seen by a first subset of cameras to obtain an estimation of a current location of the item of interest.

Based on the estimation of the current location of the item of interest, the central station 101 selects or identifies a second subset of cameras, and instructs the second subset of cameras to live stream images from image sensors of cameras in the second subset to the display device of the central station 101 for presentation to the authorized person.

The non-volatile memory (e.g., 113, 123) of a camera (e.g., 111 or 121) in FIG. 1, the memory device 137 of the digital camera 135 in FIG. 2, and/or the integrated circuit device 201 of FIG. 3 can be implemented as a memory sub-system. The memory sub-system can have a programming manager 413 configured to perform the operations of storing an item model 103 in a configuration to cause the deep learning accelerator 141 to perform the matrix computations of the artificial neural network 309, in response to requests received in a host interface 145 to store images 139 from an image sensor. The programming manager 413 can be further configured to generate the reports to the central station 101.

Examples of storage devices and memory modules as memory sub-systems are described below in conjunction with FIG. 9. In general, a host system can utilize a memory sub-system that includes one or more components, such as memory devices that store data. The host system can provide data to be stored at the memory sub-system and can request data to be retrieved from the memory sub-system.

Figure 9:
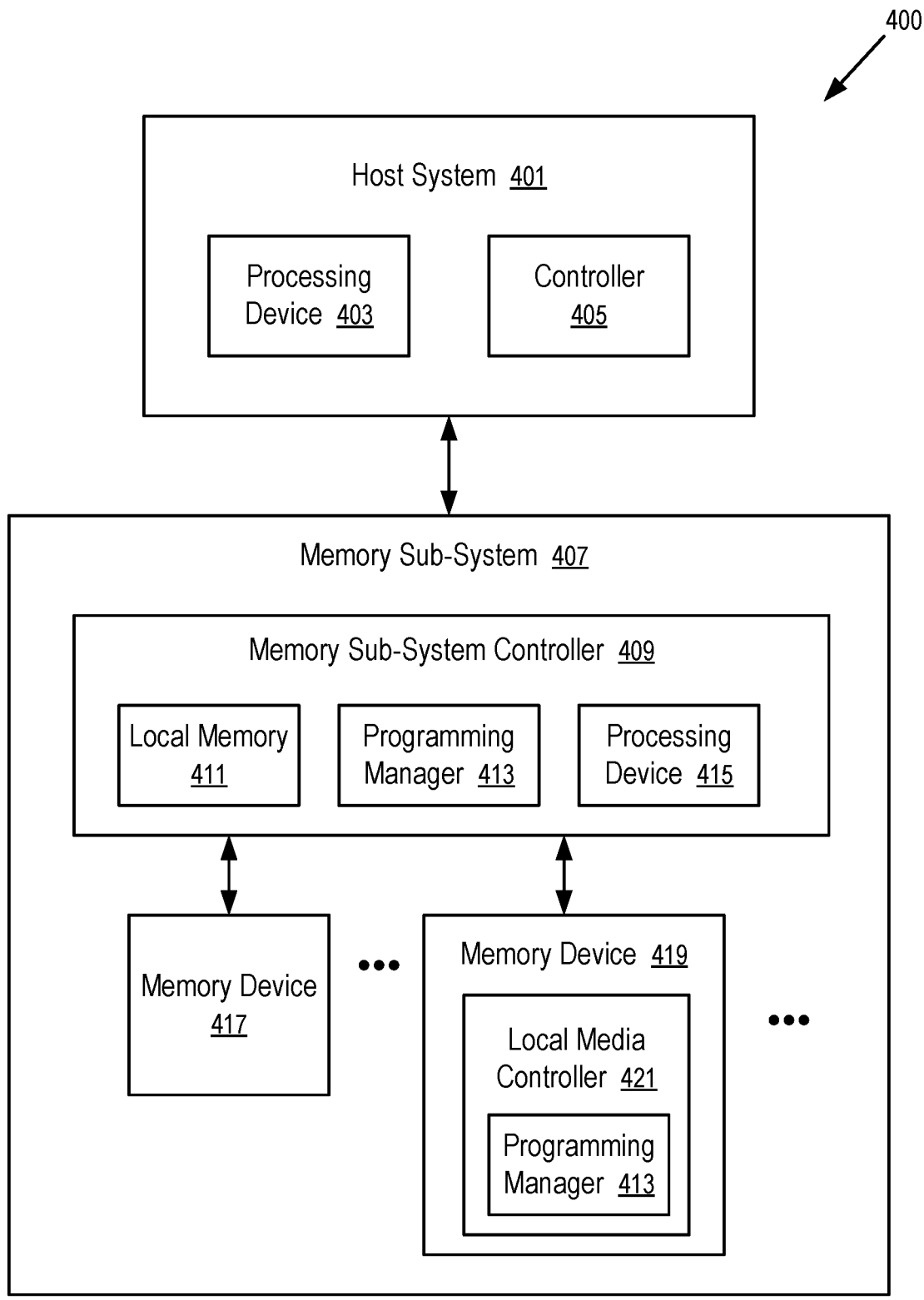
FIG. 9 illustrates an example computing system having a memory sub-system in accordance with some embodiments of the present disclosure.

FIG. 9 illustrates an example computing system 400 that includes a memory sub-system 407 in accordance with some embodiments of the present disclosure. The memory sub-system 407 can include media, such as one or more volatile memory devices (e.g., memory device 417), one or more non-volatile memory devices (e.g., memory device 419), or a combination of such.

A memory sub-system 407 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 400 can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The computing system 400 can include a host system 401 that is coupled to one or more memory sub-systems 407. FIG. 9 illustrates one example of a host system 401 coupled to one memory sub-system 407. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 401 can include a processor chipset (e.g., processing device 403) and a software stack executed by the processor chipset. The processor chipset can include one or more cores, one or more caches, a memory controller (e.g., controller 405) (e.g., NVDIMM controller), and a storage protocol controller (e.g., PCIe controller, SATA controller). The host system 401 uses the memory sub-system 407, for example, to write data to the memory sub-system 407 and read data from the memory sub-system 407.

The host system 401 can be coupled to the memory sub-system 407 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system 401 and the memory sub-system 407. The host system 401 can further utilize an NVM Express (NVMe) interface to access components (e.g., memory devices 419) when the memory sub-system 407 is coupled with the host system 401 by the PCIe interface. The physical host interface can provide an interface for passing control, address, data, and other signals between the memory sub-system 407 and the host system 401. FIG. 9 illustrates a memory sub-system 407 as an example. In general, the host system 401 can access multiple memory sub-systems via a same communication connection, multiple separate communication connections, and/or a combination of communication connections.

The processing device 403 of the host system 401 can be, for example, a microprocessor, a central processing unit (CPU), a processing core of a processor, an execution unit, a System on a Chip (SoC), etc. In some instances, the controller 405 can be referred to as a memory controller, a memory management unit, and/or an initiator. In one example, the controller 405 controls the communications over a bus coupled between the host system 401 and the memory sub-system 407. In general, the controller 405 can send commands or requests to the memory sub-system 407 for desired access to memory devices 419, 417. The controller 405 can further include interface circuitry to communicate with the memory sub-system 407. The interface circuitry can convert responses received from the memory sub-system 407 into information for the host system 401.

The controller 405 of the host system 401 can communicate with the controller 409 of the memory sub-system 407 to perform operations such as reading data, writing data, or erasing data at the memory devices 419, 417 and other such operations. In some instances, the controller 405 is integrated within the same package of the processing device 403. In other instances, the controller 405 is separate from the package of the processing device 403. The controller 405 and/or the processing device 403 can include hardware such as one or more integrated circuits (ICs) and/or discrete components, a buffer memory, a cache memory, or a combination thereof. The controller 405 and/or the processing device 403 can be a microcontroller, special purpose logic circuitry (e.g., a field programmable gate array (FPGA), an application specific integrated circuit (ASIC), etc.), or another suitable processor.

The memory devices 419, 417 can include any combination of the different types of non-volatile memory components and/or volatile memory components. The volatile memory devices (e.g., memory device 417) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 419 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 419 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 419 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 419 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 409 (or controller 409 for simplicity) can communicate with the memory devices 419 to perform operations such as reading data, writing data, or erasing data at the memory devices 419 and other such operations (e.g., in response to commands scheduled on a command bus by controller 405). The controller 409 can include hardware such as one or more integrated circuits (ICs) and/or discrete components, a buffer memory, or a combination thereof. The hardware can include digital circuitry with dedicated (e.g., hard-coded) logic to perform the operations described herein. The controller 409 can be a microcontroller, special purpose logic circuitry (e.g., a field programmable gate array (FPGA), an application specific integrated circuit (ASIC), etc.), or another suitable processor.

The controller 409 can include a processing device 415 (e.g., processor) configured to execute instructions stored in a local memory 411. In the illustrated example, the local memory 411 of the controller 409 includes an embedded memory configured to store instructions for performing various processes, operations, logic flows, and routines that control operation of the memory sub-system 407, including handling communications between the memory sub-system 407 and the host system 401.

In some embodiments, the local memory 411 can include memory registers storing memory pointers, fetched data, etc. The local memory 411 can also include read-only memory (ROM) for storing micro-code. While the example memory sub-system 407 in FIG. 9 has been illustrated as including the controller 409, in another embodiment of the present disclosure, a memory sub-system 407 does not include a controller 409, and can instead rely upon external control (e.g., provided by an external host, or by a processor or controller separate from the memory sub-system).

In general, the controller 409 can receive commands or operations from the host system 401 and can convert the commands or operations into instructions or appropriate commands to achieve the desired access to the memory devices 419. The controller 409 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 419. The controller 409 can further include host interface circuitry to communicate with the host system 401 via the physical host interface. The host interface circuitry can convert the commands received from the host system into command instructions to access the memory devices 419 as well as convert responses associated with the memory devices 419 into information for the host system 401.

The memory sub-system 407 can also include additional circuitry or components that are not illustrated. In some embodiments, the memory sub-system 407 can include a cache or buffer (e.g., DRAM) and address circuitry (e.g., a row decoder and a column decoder) that can receive an address from the controller 409 and decode the address to access the memory devices 419.

In some embodiments, the memory devices 419 include local media controllers 421 that operate in conjunction with the memory sub-system controller 409 to execute operations on one or more memory cells of the memory devices 419. An external controller (e.g., memory sub-system controller 409) can externally manage the memory device 419 (e.g., perform media management operations on the memory device 419). In some embodiments, a memory device 419 is a managed memory device, which is a raw memory device combined with a local controller (e.g., local media controller 421) for media management within the same memory device package. An example of a managed memory device is a managed NAND (MNAND) device.

The controller 409 and/or a memory device 419 can include a programming manager 413 configured to search for and locate an item of interest. In some embodiments, the controller 409 in the memory sub-system 407 and/or the controller 421 in the memory device 419 can include at least a portion of the programming manager 413. In other embodiments, or in combination, the controller 405 and/or the processing device 403 in the host system 401 includes at least a portion of the programming manager 413. For example, the controller 409, the controller 405, and/or the processing device 403 can include logic circuitry implementing the programming manager 413. For example, the controller 409, or the processing device 403 (e.g., processor) of the host system 401, can be configured to execute instructions stored in memory for performing the operations of the programming manager 413 described herein. In some embodiments, the programming manager 413 is implemented in an integrated circuit chip disposed in the memory sub-system 407. In other embodiments, the programming manager 413 can be part of firmware of the memory sub-system 407, an operating system of the host system 401, a device driver, or an application, or any combination therein.

For example, the programming manager 413 implemented in the controller 409 and/or the controller 421 can be configured via instructions and/or logic circuit to search for and locate an item of interest.

Figure 10:
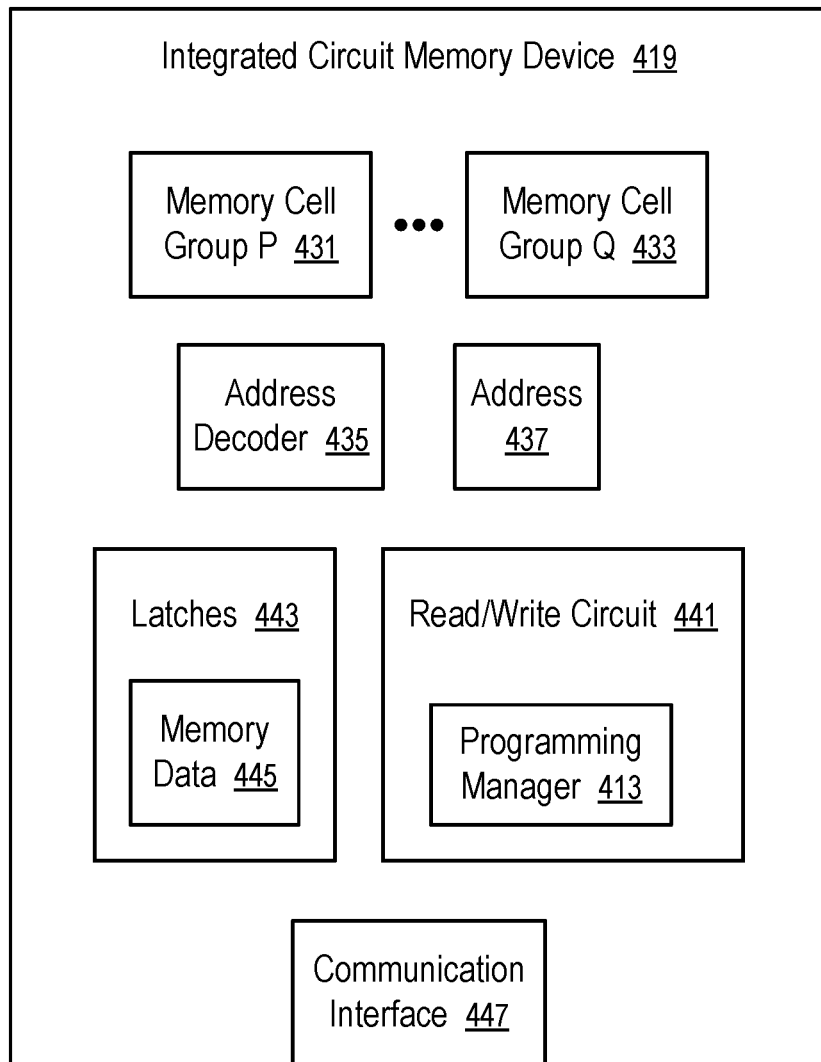
FIG. 10 illustrates an integrated circuit memory device configured according to one embodiment.

FIG. 10 illustrates an integrated circuit memory device configured according to one embodiment. For example, the memory devices 419 in the memory sub-system 407 of FIG. 9 can be implemented using the integrated circuit memory device 419 of FIG. 10.

The integrated circuit memory device 419 can be enclosed in a single integrated circuit package. The integrated circuit memory device 419 includes multiple groups 431, . . . , 433 of memory cells that can be formed in one or more integrated circuit dies. A typical memory cell in a group 431 (or group 433) can be programmed to store one or more bits of data.

Some of the memory cells in the integrated circuit memory device 419 can be configured to be operated together for a particular type of operations. For example, memory cells on an integrated circuit die can be organized in planes, blocks, and pages. A plane contains multiple blocks; a block contains multiple pages; and a page can have multiple strings of memory cells. For example, an integrated circuit die can be the smallest unit that can independently execute commands or report status; identical, concurrent operations can be executed in parallel on multiple planes in an integrated circuit die; a block can be the smallest unit to perform an erase operation; and a page can be the smallest unit to perform a data program operation (to write data into memory cells). Each string has its memory cells connected to a common bitline; and the control gates of the memory cells at the same positions in the strings in a block or page are connected to a common wordline. Control signals can be applied to wordlines and bitlines to address the individual memory cells.

The integrated circuit memory device 419 has a communication interface 447 to receive a command having an address 437 from the controller 409 of a memory sub-system 407, retrieve memory data 445 from memory cells identified by the memory address 437, and provide at least the memory data 445 as part of a response to the command. Optionally, the memory device 419 may decode the memory data 445 (e.g., using an error-correcting code (ECC) technique) and provide the decoded data as part of a response to the command. An address decoder 435 of the integrated circuit memory device 419 converts the address 437 into control signals to select a group of memory cells in the integrated circuit memory device 419; and a read/write circuit 441 of the integrated circuit memory device 419 performs operations to determine the memory data 445 stored in the memory cells at the address 437.

The integrated circuit memory device 419 has a set of latches 443, or buffers, to hold memory data 445 temporarily while the read/write circuit 441 is programming the threshold voltages of a memory cell group (e.g., 431 or 433) to store data, or evaluating the threshold voltages of a memory cell group (e.g., 431 or 433) to retrieve data.

Figure 11:
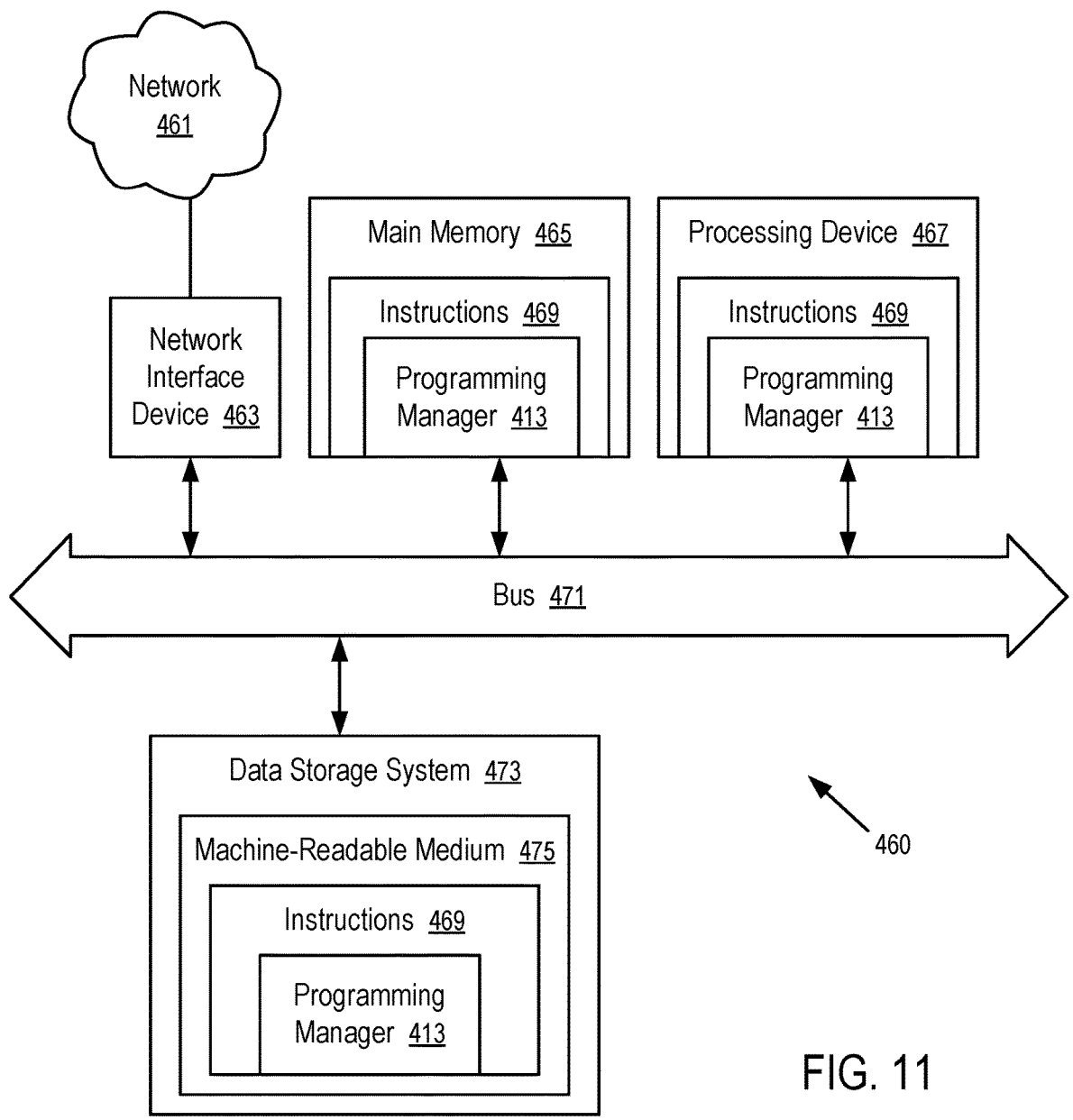
FIG. 11 is a block diagram of an example computer system in which embodiments of the present disclosure can operate.

FIG. 11 illustrates an example machine of a computer system 460 within which a set of instructions, for causing the machine to perform any one or more of the methodologies discussed herein, can be executed. In some embodiments, the computer system 460 can correspond to a host system (e.g., the host system 401 of FIG. 9) that includes, is coupled to, or utilizes a memory sub-system (e.g., the memory sub-system 407 of FIG. 9) or can be used to perform the operations of a programming manager 413 (e.g., to execute instructions to perform operations corresponding to the programming manager 413 described with reference to FIG. 1 to FIG. 10). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 460 includes a processing device 467, a main memory 465 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 473, which communicate with each other via a bus 471 (which can include multiple buses).

The processing device 467 can be one or more general-purpose processing devices such as a microprocessor, a central processing unit, or the like. More particularly, the processing device 467 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 467 can also be one or more special-purpose processing devices such as an application specific integrated circuit (ASIC), a field programmable gate array (FPGA), a digital signal processor (DSP), network processor, or the like. The processing device 467 is configured to execute instructions 469 for performing the operations and steps discussed herein. The computer system 460 can further include a network interface device 463 to communicate over the network 461.

The data storage system 473 can include a machine-readable medium 475 (also known as a computer-readable medium) on which is stored one or more sets of instructions 469 or software embodying any one or more of the methodologies or functions described herein. The instructions 469 can also reside, completely or at least partially, within the main memory 465 and/or within the processing device 467 during execution thereof by the computer system 460, the main memory 465 and the processing device 467 also constituting machine-readable storage media. The machine-readable medium 475, data storage system 473, and/or main memory 465 can correspond to the memory sub-system 407 of FIG. 9.

In one embodiment, the instructions 469 include instructions to implement functionality corresponding to a programming manager 413 (e.g., the programming manager 413 described with reference to FIG. 1 to FIG. 10). While the machine-readable medium 475 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
   a camera, including:
      an image sensor;
      a memory device, including:
         non-volatile memory cells configured to store first data representative of images captured by the image sensor; and
         a deep learning accelerator having a logic circuit configured to perform matrix computations, wherein a portion of the non-volatile memory cells are used to implement the logic circuit of the deep learning accelerator;
   a processor different from the memory device; and
   a network interface, wherein the processor is configured to receive, via the network interface and from a central station that is remote from the apparatus, second data representative of an item model, and store the second data in the non-volatile memory cells to cause the logic circuit of the deep learning accelerator to perform computations of an artificial neural network using the first data as an input;

wherein an output of the artificial neural network is configured to indicate a classification of whether the images are relevant to an item of interest characterized by the item model; and wherein in response to the output having a first classification that the images are relevant to the item of interest, the processor is configured to transmit third data comprising a report including the images, via the network interface, to the central station.

2. The apparatus of claim 1, wherein the memory device further includes a controller, and a host interface; and wherein the memory device is configured to receive, via the host interface, the first data to be stored in the memory device.

3. The apparatus of claim 2, wherein the item model includes fourth data representative of instructions executable by the logic circuit, and fifth data representative of matrices of the artificial neural network.

4. The apparatus of claim 3, wherein the instructions of the item model stored in the non-volatile memory cells are configured to be executed by the logic circuit, in response to the host interface receiving the first data, using the first data as the input to generate the output.

5. The apparatus of claim 4, wherein in response to a second classification provided in an output of the artificial neural network in processing second images as an input that the second images are not relevant to the item of interest, the processor is configured to skip transmitting the second images to the central station.

6. The apparatus of claim 4, wherein when the output has the first classification, the output further includes a segment identified by the artificial neural network for extraction from an image among the images.

7. The apparatus of claim 4, wherein the memory device is configured with a non-volatile memory to store a video clip; after an incident in vicinity of the apparatus, the apparatus is configured to transmit the video clip to the central station in response to a request from the central station.

8. A system, comprising:
a central station coupled with a communications network connected to a plurality of cameras installed at a plurality of locations respectively, wherein each respective camera in the plurality of cameras includes a memory device having:
a non-volatile memory to store first data representative of images captured by the respective camera; and
a deep learning accelerator having a logic circuit configured to perform matrix computations, wherein cells of the non-volatile memory are used to implement the logic circuit of the deep learning accelerator;
wherein the central station is configured to transmit, to the plurality of cameras via the communications network, second data representative of an item model;
wherein when the item model is stored in the respective camera, the logic circuit of the deep learning accelerator is configured to perform computations of a first artificial neural network using the first data as an input and to generate an output of the first artificial neural network, the output having a classification of whether the images are relevant to an item of interest characterized by the item model; and
wherein in response to the output having a first classification that the images are relevant to the item of interest, the respective camera is configured to transmit a report including the images, via the communications network and using a processor separate from the memory device, to the central station.

9. The system of claim 8, wherein the central station has a second artificial neural network configured to receive, as an input, the images transmitted from the respective camera, to generate a classification of whether the images are relevant to the item of interest.

10. The system of claim 9, wherein the second artificial neural network is more accurate than the first artificial neural network in classifying whether the images are relevant to the item of interest.

11. The system of claim 9, wherein the central station includes a display device to present the images in response to the second artificial neural network identifying the images as being relevant to the item of interest.

12. The system of claim 11, wherein the images are first images; and in response to the second artificial neural network identifying the images as being relevant to the item of interest, the central station is configured to request the respective camera to transmit to the central station, second images captured in time adjacent to the first images.

13. The system of claim 12, wherein the central station is configured to estimate a real time location of the item of interest based at least in part on movements of the item of interest in the first images and the second images.

14. The system of claim 11, wherein the central station is configured to analyze a pattern of time and location of the item of interest as captured in a first subset of cameras to identify a second subset of cameras, and instruct the second subset of cameras to live stream images from image sensors of cameras in the second subset to a display device in the central station.

15. The system of claim 14, wherein the central station is configured to generate the first artificial neural network in the item model from the second artificial neural network, and compile a description of the first artificial neural network into the item model.

16. A method, comprising:
communicating, by a central station over a communications network with a plurality of cameras configured at a plurality of locations respectively, wherein each respective camera in the plurality of cameras includes a memory device having:
a non-volatile random access memory to store first data representative of images captured by the respective camera; and
a deep learning accelerator having a logic circuit configured to perform matrix computations, wherein cells of the non-volatile random access memory are used to implement the logic circuit of the deep learning accelerator;
generating, by the central station, an item model configured, when stored in the non-volatile random access memory of the respective camera, to cause the logic circuit of the deep learning accelerator to perform computations of a first artificial neural network using the first data as an input and to generate an output of the first artificial neural network, the output having a classification of whether the images are relevant to an item of interest characterized by the item model;
transmitting, by the central station, to the plurality of cameras via the communications network, second data representative of the item model to cause the item model to be stored in the non-volatile random access memory of the respective camera;
receiving, in the central station and responsive to the output having a first classification that the images are relevant to the item of interest, a report including the images from the respective camera via the communications network, wherein the report is transmitted to the central station by a processor of the respective camera, wherein the processor of the respective camera is separate from the memory device of the respective camera.

17. The method of claim 16, further comprising:
generating, by the central station, a classification of whether the images are relevant to the item of interest using a second artificial neural network that is more accurate than the first artificial neural network.

18. The method of claim 17, further comprising:
presenting the images on a display device of the central station in response to the second artificial neural network identifying the images as being relevant to the item of interest.

19. The method of claim 18, further comprising:
analyzing a pattern of movement, time, and location of the item of interest as captured in a first subset of cameras to obtain an estimation of a current location of the item of interest;
identify a second subset of cameras based on the estimation of the current location of the item of interest; and
instructing the second subset of cameras to live stream images from image sensors of cameras in the second subset to the display device of the central station.

20. The method of claim 19, further comprising:
generating, based on the second artificial neural network, the first artificial neural network in the item model; and
compiling a description of the first artificial neural network to generate the item model.

* * * * *